United States Patent [19]
Batscheider et al.
[11] 4,430,357
[45] Feb. 7, 1984

[54] METHOD OF CLEANING GRAIN

[76] Inventors: Alfred Batscheider, Casa Maralba, 6948 Porza S. Lugano, Switzerland; G. Bernasek, Im Winkel 11, 3400 Göttingen, Fed. Rep. of Germany

[21] Appl. No.: 443,746

[22] Filed: Nov. 22, 1982

Related U.S. Application Data

[63] Continuation of Ser. No. 223,299, Jan. 8, 1981, abandoned.

[30] Foreign Application Priority Data

Dec. 29, 1979 [DE] Fed. Rep. of Germany ....... 2952708

[51] Int. Cl.3 ........................ A23L 1/20; A23N 12/00

[52] U.S. Cl. .................................... 426/626; 426/442; 426/483

[58] Field of Search ............... 426/618, 482, 483, 507, 426/455, 460, 626, 442, 254

[56] References Cited

U.S. PATENT DOCUMENTS

| | | | |
|---|---|---|---|
| 1,221,636 | 4/1917 | Von Hagen | 426/442 |
| 3,194,664 | 7/1965 | Eytinge | 426/626 |
| 3,264,113 | 8/1966 | Barta et al. | 426/254 |

*Primary Examiner*—Raymond N. Jones
*Assistant Examiner*—George C. Yeung
*Attorney, Agent, or Firm*—Michael J. Striker

[57] ABSTRACT

Grain for human consumption is cleaned by washing it for at least 8 minutes with calcium hydroxide, whereupon the calcium hydroxide is neutralized by converting it in the presence of carbon dioxide into calcium carbonate, and the two outermost layers of the four-layer pericarp surrounding the grain are then removed mechanically.

2 Claims, No Drawings

METHOD OF CLEANING GRAIN

This is a continuation of application Ser. No. 223,299, filed Jan. 8, 1981, now abandoned.

BACKGROUND OF THE INVENTION

The present invention relates to a method of cleaning grain.

Before grain can be converted to whole-grain products or to bran for dietetic purposes, it must be cleaned to the maximum possible extent, particularly on its surface including in the crease which is present in each kernel of grain. Such cleaning is also desirable if flour is to be produced from grain under conditions which involve a high degree of milling. None of the known and heretofore practiced methods meet this requirement even remotely, in part because the rill in the grain is deep and almost closed, and in part because there are many different types of contaminants to be removed and these different types have different physical characteristics.

The contamination of the grain surface basically consists of mechanical dirt which is impregnated with various fat and water soluble substances so that it often forms solid encrustations which are difficult to remove and which cannot even be completely removed from the free surface by washing with water, so that certainly the dirt or contamination present in the deep crease remains almost completely untouched by the washing process.

This dirt often contains residues of deleterious chemicals, such as weed killers, pesticides, heavy metals such as lead, quicksilver or cadmium, radio-nucleides and strontium, cesium or tritium and carcinogens such as for example benzopyrene. Because a part of these deleterious substances enters into two outer layers of the pericarp; because mold hyphae firmly grow into the hypodermis and because the empty spaces between the cells of the hypodermis are filled with bacteria, it is advantageous to also remove the loose surface layers i.e. epidermis and the hypodermis when the surface of the grain is being cleaned. This must take into account that the cuticula of the grain consists of several layers, namely the outer pericarp or epidermis, the elongate cell layer or hypodermis located beneath it, and the cross cell layer located beneath the hypodermis, and finally a fourth tube-cell layer which is the innermost one. The pericarp (fruit-coat) composed of the four aforementioned layers surrounds the seed coat which, together with the aleuron layer beneath it, in turn surrounds the starchy endosperm. The pericarp composed of the four layers has, in the case of wheat, a weight percentage of approximately 4.4% and in the case of rye of approximately 6.3% of the total weight of the grain. The two layers of the pericarp which are to be removed have, in both instances, a weight percentage of approximately 3.5 of the total weight of the grain.

The removal of the two outer layers of the pericarp (epidermes + hypodermis) cannot be effected with the known methods. Dry peeling is not very effective. Wet peeling is in many instances undesirable because the smeary substances which form with the wet dust constitute a most suitable substrate for microorganisms which grow rapidly and contaminate not only the partially peeled grain but also the equipment for treating and conveying it. Also, in the heretofore practiced and known wet peeling methods, the crease in the grain is practically untouched.

Chemical peeling methods should inherently be more effective than those mentioned above, but cannot be used because the chemicals which are required are forbidden by the Pure Food Laws and also in many instances have a disadvantageous effect upon formation of flour during the milling of the grain or upon the baking characteristics of flour so produced.

Also to be removed, and to be removed completely, is the filth which is in part regularly composed of insect particles and insect eggs, such as grain borers, flour moths and mites. These eggs cannot be removed during washing because they are located in the crease where they can rapidly develop in the event of advantageous ambient conditions.

SUMMARY OF THE INVENTION

It is, accordingly, an object of the present invention to overcome the disadvantages of the prior art.

A more particular object of the invention is to provide an improved method of obtaining a complete cleaning of the surface of food-grain kernels.

Another object of the invention is to provide an improved method of obtaining complete cleaning of the surface of food-grain kernels by a combination of chemical and mechanical treatments.

The method according to the invention must fulfill the following requirements.

The loose surface layers, namely the epidermis and the hypodermis, are to be removed together with the contaminants, including completely from inside the crease. To prevent a splintering of the epidermis and hypodermis these surface layers are to be chemically solidified prior to their mechanical removal, in order to make them more elastic. The seed cover is to remain intact. A brushing or abrading of the epidermis hypodermis is to be carried out, while the seed coat is still dry and hard. This is facilitated due to the fact that the seed coat resists the entry of water for a relatively long period of time and therefore remains during this period of time completely dry and solid. It obtains additional mechanical protection during this period from the also thickwalled cross and tube cells which are grown together with it. On this solid substrate the swelled and elastic soft parts of the epidermis and hypodermis can readily move and can easily be abraded or brushed off. It is advantageous to obtain a condition of maximum tension between the layers to be removed on the one hand and the remaining hard seed coat with the theretogrown cross and tube cell layers on the other hand.

In order to be able to clean the crease of the grain its opening is to be effected, for example by an impact device. This can take place after the exposed surface of the kernel of grain has already been cleaned.

The microorganisms which are present on the exposed surface and within the crease are to be removed, and it must be assured that they cannot increase and contaminate the equipment during the treatment. Parasite eggs must be killed and removed.

The chemical or chemicals used in the method must not adversely influence the making of flour from the grain nor the baking of such flour, and after the processing is completed the chemical must be removable without a trace, or must be convertible into a natural food factor and not be in violation of food laws.

In accordance with the invention all these requirements are met in that the grains are washed for at least eight minutes with calcium hydroxide prior to the mechanical separation of the loose surface layers, namely the epidermis and the hypodermis. This not only completely removes the bacteria and mold hyphae which have entered into the hypodermis, but also reduces the content of chemical contaminants by 50–70%.

DESCRIPTION OF PREFERRED EMBODIMENTS

The invention will now be described with reference to exemplary embodiments.

In a first embodiment the mains water used for wash-water purposes is saturated in a container with a mixing device, with calcium hydroxide. For this purpose 1.2 grams of lime are required for each liter of water. After solution at constant stirring the undissolved components are filtered off and the clear lime water is used as washing water. The use of calcium hydroxide results in a complete solidification of the outer pericarp and at the same time it becomes substantially more elastic than if it were subjected, in accordance with common usage, merely to swelling in water. The lime water solution dissolves the dirt encrustations completely and prevents the growth of microorganisms, since these as well as parasite eggs are devitalized due to the dissolution of their cell membranes and are separated from the grain surface. To improve this last-mentioned effect the treatment of the grain surface with lime water can be increased without any disadvantage up to 30 minutes, so that after the 10-minute washing time the moist grain can be allowed to sit for twenty minutes before it is placed into a centrifuge in which the remaining water is removed from its surface. Another advantage resides in the fact that after the washing has been completed and if thereafter $CO_2$ is added, the abrasive $CaCO_3$ which is known from the prior art, is directly deposited in the hollow spaces of the elongate cell layer (hypodermis) where it is more effective than if, as known, it is applied only to the grain surface prior to the abrading of the outer pericarp. When the method is carried out in one step the conventional initial dry cleaning of the grain is effected and thereafter at first the crease is opened, than the grain washed for 10 minutes in the saturated lime water by agitation therein, under usage of approximately 3 liters of water per kilogram of grain. During this washing time of 10 minutes 4% by weight of water (related to the total weight of the grain) penetrates into the elongate cell layer, so that a maximum tension is obtained between the swelled and expanding outer pericarp on the one hand and the still dry and firm seed coat with the thereto-grown cross and tube cells on the other hand, which facilitates the subsequent separation of the outer pericarp by abrading and brushing. The main purpose of the 10-minute dwell of the grain in the lime water is the complete solidification of the outer pericarp which at the same time becomes elastic and can be more easily removed without splintering. Thereafter, carbon dioxide is admitted under pressure into the washing installation, whereby the calcium hydroxide is completely converted into calcium carbonate within the course of a further minute.

After this is completed, the washed grain is placed into the centrifuge for centrifugal removal of excess water, and at this time already a part of the hardened outer pericarp is removed by the centrifuging. The grains are then subsequently rubbed against one another, and the intensity of the abrasion thus obtained should be increased as much as possible. The separated parts of the outer pericarp are at the same time removed by suction. Finally, the grains are lightly brushed in order to remove any residually adhering parts of the outer pericarp, and this also is effected under continuous suction.

If the method is carried out in two steps, rather than in one step, the grain is first again subjected to dry cleaning in the usual manner and thereupon washed for 10 minutes in a grain washing machine under current agitation with 3 liters of saturated lime water per kilogram of grain. During this time period 4% by weight of water enter into the two outer loose layers of the pericarp so that the elongate cell layer is filled with water and maximum tension is obtained between this layer on the one hand and the seed coat with the cross and tube cells on the other hand, the seed coat having remained firm. In this time maximum firming of the outer pericarp by $Ca(OH)_2$ is also obtained at simultaneous increase of its elasticity. If there is a strong presence of microorganisms or parasite eggs it is possible, without any disadvantage, to include a 20-minute dwell time between washing and centrifuging in order to increase the killing effect of the calcium hydroxide on the microorganisms and the parasite eggs. Thereafter, carbon dioxide is admitted into the washing installation under pressure to neutralize the calcium hydroxide, and finally the excess water is removed by centrifuging. The grains are then made to rub against one another, for example in a rice polishing machine, until the outer pericarp is separated from the free grain surface and can be removed by suction. This completes the first phase of cleaning.

To start the second phase the crease of the grain is opened by machine action. During this operation a part of the remaining outer pericarp particles is already flung out of the crease. Thereafter, the grain is washed once more for 5 minutes in lime water while being agitated, and during this operation even any residual portions of dirt and contaminants, microorganisms or parasite eggs which may have remained on the free already exposed surface during the abrasion of the first phase, are now completely removed. These two effects cannot be obtained if the method is carried out in a single step. After the expiration of 5 minutes carbon dioxide is admitted into the washing installation in order to neutralize the calcium hydroxide and convert it into calcium carbonate. In this manner the abrasive aid $CaCO_3$, which in the known methods is applied only to the exposed surface of the grain, can also in accordance with the invention be introduced into the empty spaces between the elongate cells, where it is particularly effective because it makes the elongate cell layer especially soft and supple. The deposition of the $CaCO_3$ is based upon the following reactions:

$$CO_2 + H_2O = H_2CO_3$$

$$H_2CO_3 + Ca(OH)_2 = \underset{\downarrow}{CaCO_3} + 2H_2O$$

After the calcium hydroxide is neutralized the grain is again introduced into the centrifuge for removal of excess water and residual portions of the outer pericarp. Finally, the grain is lightly brushed and any final parts of the outer pericarp which are removed by such brushing are withdrawn by suction. Thereafter the grain can either be milled to flour or to grit, or can be converted to other products, such as for example breakfast flakes, or it can be stored for a further period of time until it is needed.

While the invention has been illustrated and described as embodied in a method of processing grain for human consumption, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. Method of cleaning grain, comprising the steps of washing the grain for 8–10 minutes with water-containing washing liquid wherein 1.2 grams of calcium hydroxide per each liter of water is used in said washing liquid whereby the washing liquid becomes saturated with calcium hydroxide so that the pericarp becomes chemically solidified and at the same time substantially more elastic and the grain has an increase in its weight of approximately 4% by adsorption of the washing liquid; neutralizing the calcium hydroxide by addition thereto after the washing of carbon dioxide so as to convert it into calcium carbonate and thereby depositing a portion of the calcium carbonate in the hypodermis of the grain; and thereafter mechanically removing the two outermost layers of the four-layer pericarp of the grain.

2. Method as defined in claim 1, wherein in that the rill of each kernel of grain is opened before the step of washing with calcium hydroxide is carried out.

* * * * *